United States Patent [19]

Shinada

[11] Patent Number: 4,724,483
[45] Date of Patent: Feb. 9, 1988

[54] INFORMATION COMPRESSING METHOD AND APPARATUS

[75] Inventor: Hidetoshi Shinada, Kanagawa, Japan

[73] Assignee: Fuji Photo Film Co., Ltd., Kanagawa, Japan

[21] Appl. No.: 923,469

[22] Filed: Oct. 27, 1986

[30] Foreign Application Priority Data

Oct. 25, 1985 [JP] Japan .................................. 60-238974

[51] Int. Cl.[4] .......................... H04N 7/12; H04N 1/00
[52] U.S. Cl. .................................... 358/135; 358/141; 358/260; 358/133; 382/56
[58] Field of Search ............... 358/133, 135, 260, 263, 358/140, 141, 160; 382/56

[56] References Cited

U.S. PATENT DOCUMENTS

4,193,092  3/1980  Stoffel ................................... 358/133
4,580,134  4/1986  Campbell et al. .................... 358/133
4,622,585  11/1986  Reitsma ................................ 358/135

Primary Examiner—Howard W. Britton
Assistant Examiner—John K. Peng
Attorney, Agent, or Firm—Sughrue, Mion, Zinn, Macpeak & Seas

[57] ABSTRACT

An information compression method and apparatus for information forms in which each from is divided into raster lines. Each raster line is divided into multi-bit units. The information of each unit is compared with that of a preceding unit. Agreement and disagreement codes are stored in a unit memory. The pattern information of disagreeing units only is stored in a pattern memory. Each raster line is then compared with all preceding raster line of this and preceeding forms by means of comparing the respective locations of the unit memory and the pattern memory. When inter-raster agreement is found, the respective locations in a raster memory are given the same address used to access the unit memory and only one set of redundant raster data is stored in the unit and pattern memories.

10 Claims, 10 Drawing Figures

FIG. 3C
a : 0 0 1 1 1 0 0 1 1 0 0 0 0 1 1 1 (REAL PATTERN OF U1)

b : 0 1 1 1 1 1 1 1 1 0 0 0 1 1 1 1 (REAL PATTERN OF U4)

c : 1 1 1 1 1 0 0 0 0 0 0 0 1 1 1 1 (REAL PATTERN OF U5)

INFORMATION COMPRESSING METHOD AND APPARATUS

BACKGROUND OF THE INVENTION

1. Field of the Invention

The present invention relates to a method of compressing a multiplicity of form information used for a computer output microfilmer (hereinafter abbreviated to "COM") or the like.

2. Background of the Invention

In the past, a computer output microfilmer has been used for combining variable information, such as revenue and expenditure accounts or the like to be written on trade books, with fixed information, such as lines or the like ruled in forms of trade books. This combined information is used to record composite information on recording media. Such a COM has been described in "Micrographics System" (second edition) by Daniel M. Costigan published by NATIONAL MICROGRAPHICS ASSOCIATION, and also in U.S. Pat. No. 4,293,202.

There have been established two different recording methods. One method comprises the steps of computer processing variable information recorded on a recording medium, such as a magnetic tape, temporarily displaying the processed variable information on a CRT screen, and superimposing the displayed picture on a picture optically read from fixed information recorded on a form slide to thereby record the superimposed picture on a frame of microfilm. The other method comprises the steps of processing variable information by a computer to obtain its picture signal thereof, scanning a form slide by a laser beam to obtain a picture signal of fixed information, and combining the two picture signals to thereby record a composite picture signal on a recording medium.

However, those recording methods have a problem in that a slippage of the record picture, a distortion of the picture or the like, is apt to occur due to external influences or an internal vibration because the form slide is optically read in hard form.

To avoid the defect, there will be suggested a method comprising the steps of previously storing form information as electronic signals in a memory (soft form), and then reading fixed information from the memory at the time of recording by a COM. This method does not directly read information from a form slide.

However, because the record picture used in such a COM generally has a resolution of 2000×2500 dots or more per frame, it is difficult to obtain a memory having a storage capacity corresponding to the required resolution. Accordingly, if a memory corresponding to this resolution is used, there arises such a double problem that the apparatus per se becomes large in size and complicated in structure.

In general, form information is composed of frame information such as ruled lines, and fixed information such as customer's name, code number, etc., to be recorded at fixed places. Accordingly, information that should be recorded is sparse and most of the form information is redundant (repetitive) or empty information. Accordingly, if the form information is compressed when it is stored in advance in a memory and the memory is used together with a COM so that the compressed form information is expanded to thereby record such a composite picture of variable information and form information as described above is recorded, it is possible to minimize the capacity of the memory in expectation of the advantages in miniaturization of the COM and lowering of manufacturing cost.

Examples of such information compressing methods, which have been generally used are a run length method, a plane encoding method, a turning-point address encoding method, and the like. In any case, a problem exists in the complexity of the method as well as in low processing speed. Particularly, because COM requires processing in a period of the order of 30 ns per picture element, the usual run length methods present difficulties in that the time allowed is too short to complete compression and expansion. U.S. patent application Ser. No. 853,294, which was filed on Apr. 17, 1986 and assigned to the same assignee as this application, discloses an information compressing method for compressing only one information form, but does not disclose a method for compressing a multiplicity of information forms. It is an important matter how a multiplicity of information forms are compressed, since most forms comprise lines or the like in trade book form which are similar to each other.

SUMMARY OF THE INVENTION

It is therefore an object of the present invention to provide an information compressing method in which processing for compressing a multiplicity of form information is made easily and speedily.

Another object of the invention is to provide an information compressing method in which a multiplicity of form information is compressed in such a form as enables the compressed information to be expanded easily and speedily.

To attain the above objects, in the information compressing method of the present invention, a multiplicity of information forms form information are stored in memories for every raster of each form information. A raster address is given to each raster with respect to each form information in the order of raster scanning. The raster information pattern of a raster corresponding to the raster address is sectioned into a plurality of units respectively composed of a plurality of bits. A unit address is given to each unit. The unit formation pattern of one unit in the raster and another unit just prior to the one unit are compared with each other. An agreement or a disagreement code is stored in a unit memory when the two units agree or disagree with each other. The unit information pattern of the one unit is stored as a real pattern in a real pattern memory when the two units disagree with each other. The raster is compared with higher ranking rasters than the raster in order with respect to the agreement/disagreement code pattern stored in the unit memory. The raster is compared with a raster ranking higher than the raster in order with respect to the unit information pattern stored in the real pattern memory. The raster address of the raster is changed into the raster address of higher-ranking raster which agrees with the raster when the two rasters agree with each other with respect to both the agreement/disagreement code pattern and the unit information pattern. The raster address of the raster is stored in a raster address memory when the compared rasters disagree with each other.

Preferably, the above-mentioned unit memory corresponding to the first unit in each of the raster always stores a disagreement code, and the above-mentioned real pattern memory corresponding thereto always stores a unit pattern fixed for the unit.

Preferably, the above-mentioned raster address memory, unit memory and real pattern memory constitute a group of memories used in the expanding process.

Other objects, features and advantages of the invention will be apparent from the following description taken in connection with the accompanying drawings.

PREFERRED EMBODIMENT OF THE INVENTION

Figure 2:
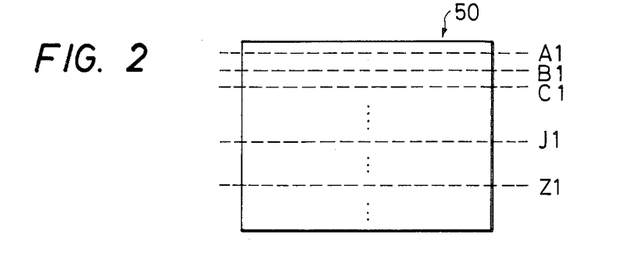
FIGS. 2, 3A, 3B, 3C, 4A, and 4B are diagrams for explaining the method according to the present invention.
Figure 3A:
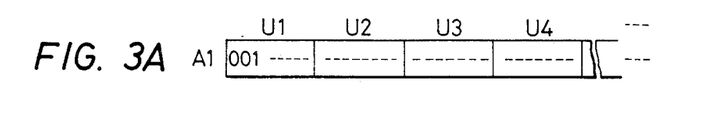
Figure 3B:
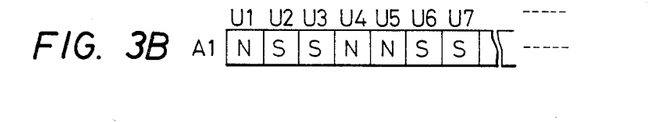
Figure 3C:
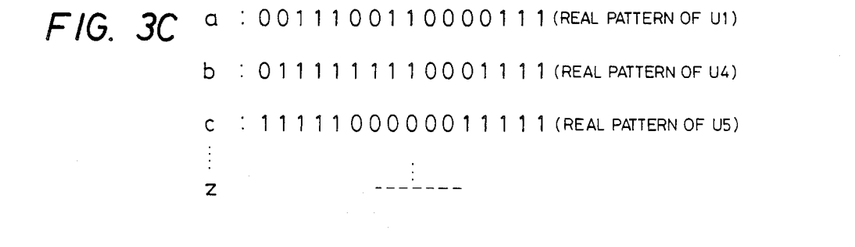
Figure 4A:
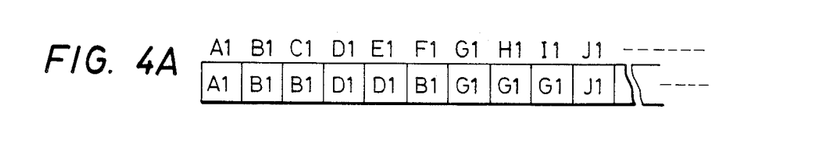
Figure 4B:
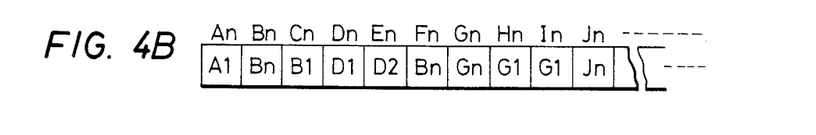

The information compressing method according to the present invention will be described with reference to the drawings, in which FIG. 2 shows each raster (scan line) on a CRT screen, FIG. 3A shows the unit addresses of the raster A of FIG. 2, FIG. 3B shows the contents of unit memory corresponding to the raster A, FIG. 3C shows the contents of a real pattern memory, and FIGS. 4A and 4B show the contents of a raster address memory.

In the method of the present invention, raster addresses A1, B1, C1 ..., J1, ..., Z1, etc., are given to rasters (scan lines) in descending order with respect to the first information form among the multiplicity of information forms.

Next, according to the ranking of the raster address, the raster information pattern of a certain raster (for example, raster line A1) is divided into consecutive n-bit long units (for example, 16-bit long unit). As shown in FIG. 3A, unit addresses U1, U2, U3, U4, etc., are respectively assigned to the 16-bit units. For example, as shown in FIG. 3C, real patterns of U1, U2 and U3 are 0011100110000111, U4 is 0111111110001111, and U5 is 1111100000011111.

Next, the unit information patterns between the respective unit and a unit just prior to the respective unit are compared. When the unit information patterns agree with each other, the unit information pattern of the respective unit is assigned an agreement code S. When the unit information patterns disagree with each other, the unit information pattern of the respective unit is assigned a disagreement code N. Thereafter, the agreement or disagreement code is stored in the unit memory as shown in FIG. 3B. The real pattern for the information pattern of the respective disagreeing unit (for example the units of the unit address U1, U4, U5 or the like for which the disagreement code N is stored in the unit memory) is stored in the real pattern memory as shown in FIG. 3c. In the drawing, each reference character a, b, c, d, ..., or z represents each real pattern address.

By the above-described procedure, repetition in the unit ranking direction within the same raster line can be compressed.

In the following, the same procedure as applied to the raster A1 is applied to the raster B1 which is located one line lower than the raster A1. The compressed information with respect to the raster B1 is obtained by the same method as used for preparing the compressed information with respect to the raster A1 (that is, the agreement/disagreement code is stored in the unit memory and the unit information pattern is stored in the real pattern memory).

Next, the contents of the unit memory for the raster B1 is compared with the contents of the unit memory for the raster A1, and at the same time, the contents of the real pattern memory for the raster B1 is compared with the contents of the real pattern memory for the raster A1. When the raster B1 agrees with the A1 raster both in the contents of the unit memory and in the contents of the real pattern memory, the raster address of the B1 raster is changed to A1 and is stored in the raster address memory. When the raster B1 disagrees with the raster A1 either in the contents of the unit memory or in the contents of the real pattern memory, the raster address of the raster B1 is left as B1 and stored in the raster address memory.

Then, the compressed information with respect to the raster C1 is obtained in the same manner as described above.

When the compressed information of the raster C1 agrees with the compressed information of the raster B1, the raster address at C1 is changed to B1 and stored in the raster address memory. Then the compressed informatin of the raster C1 is compared with that of A1 and if agreement is found, the raster address for C1 is changed to A1 and stored in the raster address memory.

When the compressed information of the raster C1 disagrees with the compressed information of both the raster B1 and A1, the raster address of the raster C1 is left unchanged and stored in the raster address memory.

After the compressed information with respect to the raster Z1 is obtained in the same manner as described above, the obtained compressed information is compared with the compressed information in each of the higher-ranking rasters (Y1, X1, W1, ..., and A1, in the stated order) and, according to the result of comparison, a suitable raster address is stored in the raster address memory.

Thus, as an example is shown in FIG. 4A, compressing redundancy in the raster ranking direction for one information from can be completed. If a next information form exists, raster addresses with respect to the form information are established in the same manner as described above although displaced by the number of rasters in the first information form. The compressed in formation for each of the raster addresses is compared with that of the raster addresses of both the same information form and previously processed information forms to thereby perform compressing as shown in FIG. 4B. When the procedure is repeated with respect to all the information forms, compressing the multiplicity of form information can be completed.

As described above, in the case where a raster address in a multiplicity of form information is designated and where the ordered raster agrees with a higher-ranking raster with respect to the raster information pattern, the address of the higher-ranking raster can be called from the raster addressed memory, or in the case where the designated raster disagrees, the address of the raster itself can be called therefrom.

Furthermore, expanding information by use of the obtained raster address memory, unit address memory and real pattern memory, can be made by the following steps. Designate a raster address. Call the raster address or a higher-ranking raster address of the same raster information pattern from the raster address memory. Call a raster having a compressed unit information from the unit memory corresponding to the raster address. Call a real pattern from the real pattern memory corresponding to the disagreement code N when the unit information is identified by the discord N. Finally call a just prior real pattern as the real pattern of the unit when the unit information is identified by the agreement code S. Accordingly, the multiplicity of form information can be expanded in a relatively short time compared with the prior art.

Figure 1:
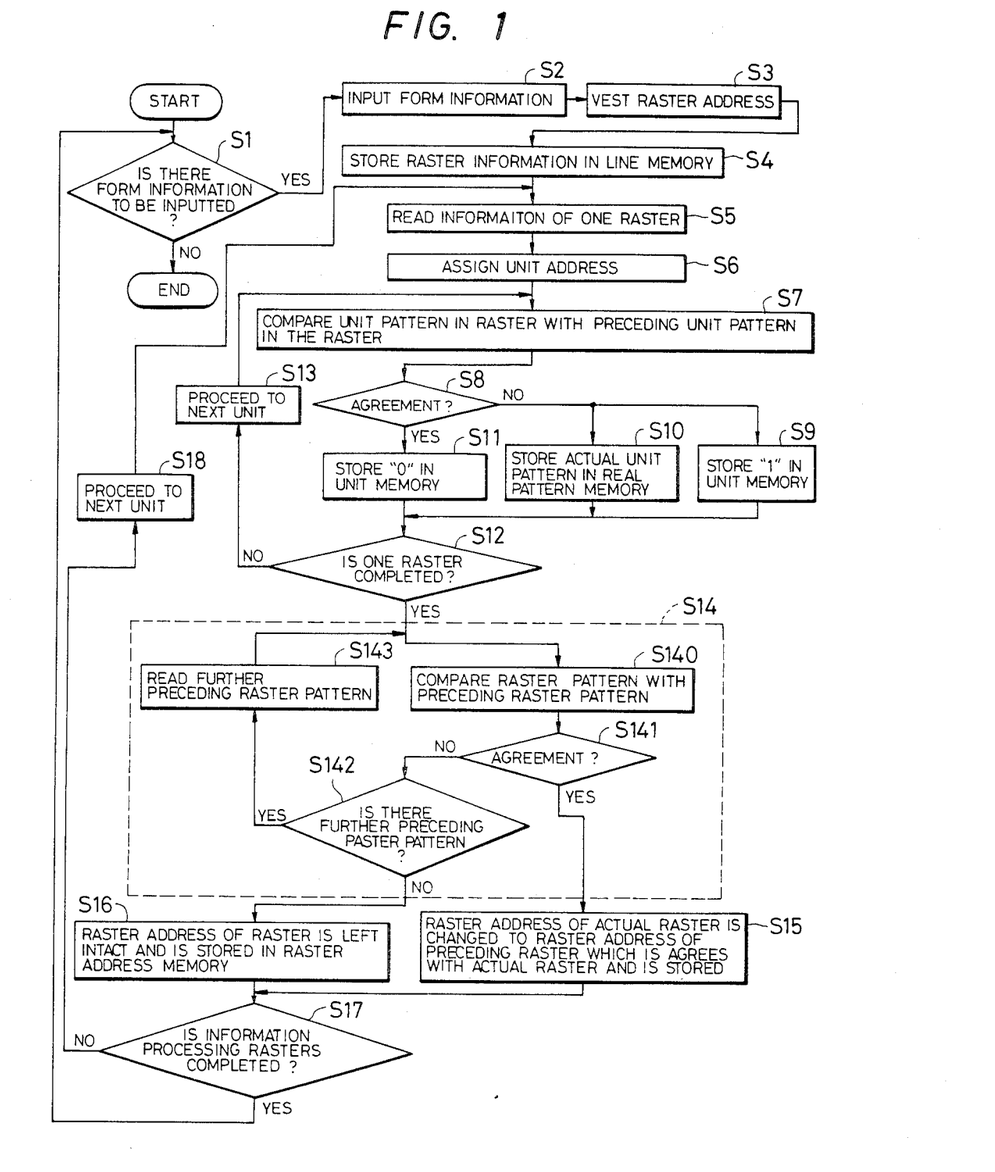
FIG. 1 is a flowchart showing the operation of an information compressing method according to the present invention.
Figure 5:
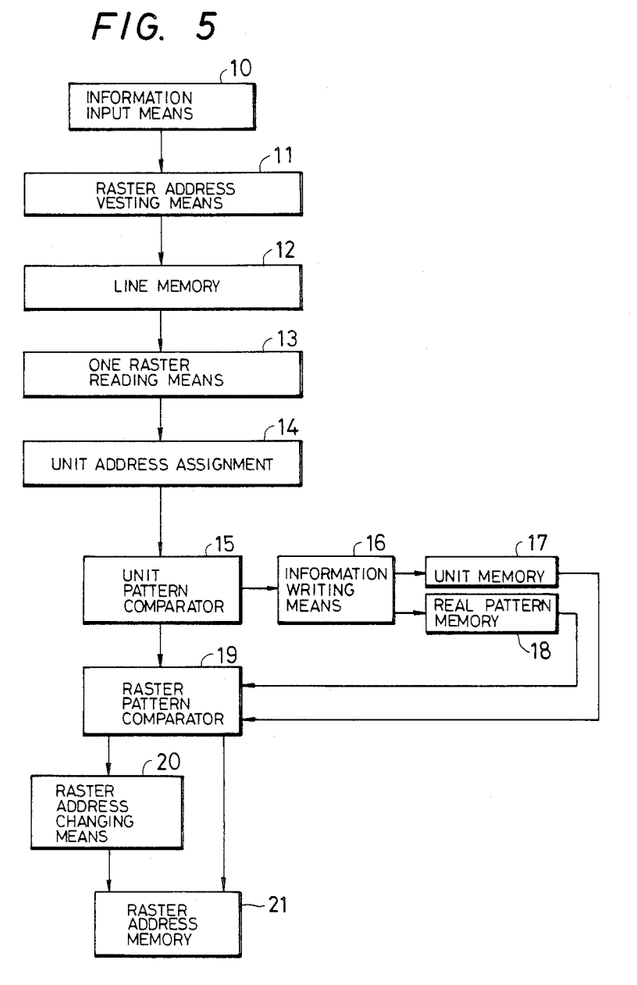
FIG. 5 is a block diagram showing an example of system for carrying our the method according to the invention.
Figure 6:
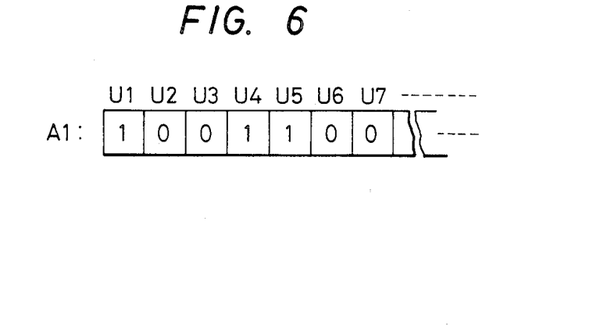
FIG. 6 is a diagram for explaining the method according to the present invention.
Figure 7:
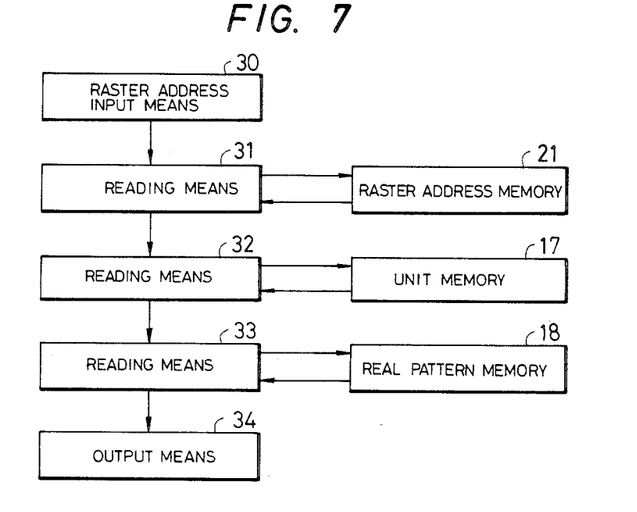
FIG. 7 is a block diagram showing an example of the system for expanding the information compressed by the method according to the invention.

An embodiment of the invention will be described hereunder with reference to the drawings, in which FIG. 1 is a flow chart showing the operation for explaining the method of the invention, FIG. 5 is a block diagram showing an example of system for using the method of the invention, FIG. 6 is a diagram for explaining the invention, and FIG. 7 is a block diagram showing an example of system for expanding the information compressed by the method of the invention.

It is to be understood that the above-mentioned drawings are not for the purpose of limitation, but for showing the main processing and processing means.

Upon starting the multi-form information compressing method according to the invention, if there is an information form to be entered (Step S1 of FIG. 1), the first information form, for example, form information to be displayed on a screen having 1980 raster lines and 2596 dots per raster line is entered by information input means 10 of FIG. 5 through the operation of a keyboard according to a predetermined program (Step S2). The thus obtained 1980-raster information is assigned with raster addresses A1, B1, C1, . . . , J1, . . . , Z1, etc., in the order of descending ranking by raster address assignment means 11 (Step S3). For subsequent information forms, the raster addresses are displaced by the number of rasters.

Next, the raster information pattern is temporarily stored in a line memory 12 (Step S4). Next, the raster information pattern of a higher-ranking raster in the line memory 12 is read (Step S5). Next, the raster information pattern is divided into consecutive n-bit long units respectively to be assigned with unit addresses U1, U2, U3, U4, etc., by unit address assignment means 14 (Step S6). The unit information patterns are read from the units within the raster in the order of descending ranking corresponding to the unit address and are compared between a present unit and a unit just prior to the unit by a unit pattern comparator 15 to thereby detect the agreement or disagreement thereof (Step S7). It is a matter of course that the unit pattern comparator 15 used herein has a buffer memory and the like.

An example with respect to the comparison of the unit information pattern will be described hereunder more in detail.

When the information patterns of the units in the raster A1 are fed to the unit pattern comparator 15 successively, the comparator 15 gives a disagreement code N (for example, compressed information "1") to the first unit of the raster, that is, the unit information pattern of the unit address U1, as shown in FIG. 3B. In other words, it is a matter of course that a disagreement code is given to the first unit in the operation of the unit pattern comparator 15 because there is no unit to be compared before the first unit. The disagreement code is stored at a corresponding address in a unit memory 17 and, at the same time, the real pattern thereof (for example, "0011100110000111" as shown in FIG. 3C is stored in a real pattern memory 18 through information writing means 16 (Steps S8, S9 and S10).

Next, if the other units in one raster are still left (Step S12), the procedure advances one step to process the next unit (Step 13) and returns to Step S7. The unit information pattern of the second address U2 and the information pattern of the address U2 stored in the real pattern memory 18 are compared by the unit pattern comparator 15.

As the result, an agreement code S (for example, compressed information "0") is given to the unit in the case where the patterns agree with each other (Steps S8 and S11), or a disagreement code N (for example, "1") is given in the case where the patterns disagree with each other (Step S9). The compressed information "0" or "1" is stored at a fixed address in the unit memory 17 through the information writing means 16 and, at the same time, the real pattern of the unit is stored in the real pattern memory 18 through the information writing means 16 in the case where the patterns disagree with each other (Step S10).

The comparison of the information pattern between a successively processed unit and a unit just prior thereto is repeated in the manner as described above, to thereby store the agreement or disagreement code in the unit memory 17 in the order of descending ranking with respect to the unit address. FIG. 6 shows a sample condition for the codes "1" and "0", in which the information pattern in each of the unit addresses U1, U4, U5, etc., is in disagreement with the immediately preceding unit and in which the pattern in each of the unit addresses U2 and U3 agrees with the pattern of the unit address U1 and the pattern in each of the unit addresses U6 and U7 agrees with the pattern of the unit address U5.

FIG. 3C shows an example of the real patterns for the disagreeing units.

The above-described procedure is repeated and at step S12 it is checked whether process for compressing redundancy in the unit ranking direction of the raster is completed. If one raster is completed, the raster information pattern of the raster and the raster information pattern of a higher-ranking raster are compared by a raster pattern comparator 19 (Step S14) to thus start the process for compressing redundancy in the raster ranking direction.

An example of the process for compressing redundancy in the raster ranking direction will be described hereunder more in detail. In practice, the process for compressing redundancy in the raster ranking direction is made by use of both the contents of the unit memory and the contents of the real pattern memory obtained by the process for compressing redundancy in the unit ranking direction of the raster.

First, the information pattern of the raster A1 corresponding to the raster address A1 is read from the line memory 12 by a one-raster reading means 13.

Next, redundancy in the unit ranking direction of the raster information pattern of the raster A1 is compressed by a series of steps from Step S6 to Step S12.

Next, the completion of the process for compressing redundancy in the unit ranking direction of the raster A1 is checked in Step S12. Thereafter the contents of the unit memory and the contents of the real pattern memory for the raster A1 (that is, compressed information in the ranking direction of the raster information pattern of the raster A1) are successively compared with the contents of the unit memory and the contents of the real pattern memory for each of the higher-ranking rasters until either agreement is found or the rasters are exhausted (Step S140 to S143).

When such a higher-ranking raster agrees with the present raster both in the contents of the unit memory and in the contents of the real pattern memory exists (Step S141), the raster address of the raster A1 is changed to the raster address of the agreeing higher-ranking raster by raster address changing means 20 and is stored in a raster address memory 21 (Step S15). When there does not exist such a higher-ranking raster that agrees with the raster A1 both in the contents of the unit memory and in the contents of the real pattern memory (Steps S141 and S142), the raster address of the raster A1 is not changed and the present raster address A1 is stored in the raster address memory 21 (Step S42).

Because this embodiment shows the case where no rasters higher in ranking than the raster A1 exist, the raster address of the raster A1 with respect to which "disagreement" is judged by the raster pattern comparator 19 is stored in the raster address memory 21 without change.

Next, at step S17 it is checked whether or not a raster information pattern exists at a raster lower in ranking than the just processed A1. When a further raster information patterns exists at the lower-ranking raster (for example, raster B1), the procedure advances by one step to process the next raster (Step S18) and returns to Step S5 to compress the raster information pattern for the lower-ranking raster in the same manner as described above. In other words, the same procedure as applied to the raster A1 (Steps S5 to S12) is applied to the raster B1 which one degree lower than the raster A1 to thus obtain the compressed information of the raster B1 similar to the compressed information of the raster A1, that is, the contents of the unit memory and the contents of the real pattern memory.

In other words, the raster pattern comparator 19 compares the contents of the unit memory and the contents of the real pattern memory between the raster A1 and the raster B1 (Step S14). When the raster B1 agrees with the raster A1 both in the contents of the unit memory and in the contents of the real pattern memory (Step S141), the raster address of the raster B1 is changed from B1 to A1 by the raster address changing means 20 and is stored in the raster address memory 21 (Step S15).

When, on the contrary, the raster B1 disagrees with the raster A1 either in the contents of the unit memory and in the contents of the real pattern memory (Steps S141 and S142), the raster address of the raster B1 is left as B1 and is stored in the raster address memory 21 (Step S16).

The compressed information of the raster C1 obtained in the same manner as described above is compared with the compressed information of the raster B1 being one degree higher than the raster C1. When the raster C1 agrees with the raster B1 both in the contents of the unit memory and in the contents of the real pattern memory, the raster address is changed from C1 to B1 and is stored in the raster address memory. Thereafter the process is started for compressing the raster information pattern of the raster D1 being lower in ranking.

When, on the contrary, the compressed information of the raster C1 disagrees with the compressed information of the raster B1 being one degree higher than the raster C1, the compressed information of the rater C1 is compared with the compressed information of the raster A1 which is next higher in ranking. When they agree with each other, the raster address is changed from C1 to A1 and is stored in the raster address memory. When they disagree with each other, on the contrary, the raster address is left as C1 and is stored in the raster address memory.

The compressed information of the raster Z1 obtained in the same manner as described above is successively compared with the compressed information in each of the rasters (Y1, X1, W1, . . . , and A1, in the stated order) and, as a result, a suitable raster address is stored in the raster address memory 21.

Such a procedure is repeated to thus compress redundancy in the raster ranking direction with respect to the first form information as shown in FIG. 4A.

When compressing information both in the unit ranking direction and in the raster ranking direction is made on all raster information stored in the raster address memory 21, the process for compressing raster information with respect to one form is completed (Step S17).

If a next information form exists, the procedure returns to Step S1. Similarly to the compressing process applied to the first form information, raster addresses An, Bn, Cn, . . . , Jn, . . . , Zn, etc, (n>1) are given to the form information. After compressed information is obtained by the first raster An divided into units, the compressed information of the raster (An) is compared with the compressed information in each of the rasters (. . . , Z1, Y1, X1, . . . , A1) of the information form in the order of ascending ranking. As the result, a suitable raster address is stored in the raster address memory. When the procedure is repeated with respect to all the form information, compressing redundancy in the raster ranking direction can be made upon the n-order form information as shown in FIG. 4B.

The above description is made mainly for an upward information compressing method whose operation is carried out in ascending order. However, this invention is not so limited. For example, this invention can be applied to a downward information compressing method whose operation is carried out in descending order.

When compressing information both in the unit ranking direction and in the raster ranking direction is made upon all the raster information in all the forms stored in the line memory, the process for compressing raster information with respect to a multiplicity of forms is completed (Steps S17 and S1).

The above-described means 10, 11, 13, 14, 16 and 20, the memories 12, 17, 18 and 21, the comparators 15 and 19, and the like can be obtained by use of electronic elements and parts generally used.

The present invention will be described with reference to FIG. 7 in respect to the case where a form slide compressed by use of the raster address memory 21, the unit memory 17 and the real pattern memory 18 is expanded.

FIG. 7 is a block diagram illustrating an information expanding circuit used in the case where form information is to be written on a recording medium such as a microfiche by a COM. Memories 21, 17 and 18 are each provided with reading means 31, 32 and 33 for access of reading signals. For example, when the order for a raster is fed from raster address input means 30 to the reading means 31 with timing for the reading of variable information being supplied from the computer, a changed or unchanged raster address for the raster called by the reading means 31 is read from the memory 21 with respect to the form information. The raster address that has just been read from the memory 21 is fed of the next reading means 32. There, the compressed information ("0" or "1") in each of the units of the raster is read corresponding to both the raster address and the unit address through access between the reading means 32 and the unit memory 17. Next the read compressed information ("1" or "0") is fed to the reading means 33. When the compressed information is "1", the real pattern of the corresponding unit is read through access between the reading means 33 and the real pattern memory 18 and is fed to output means 34 for the purpose of output of the real pattern. On the contrary, when compressed information is "0", the signal is fed to the output means 34 for the purpose of output of the same unit information pattern as the unit just prior thereto. The COM is operated by the output signals thus obtained, so that multiform information, such as several kinds of ruled line, and variable information, such as customer item, account item and the like, can be together recorded.

Although the present invention has been described in its preferred form with a certain degree of particularity, it is understood that the invention is not limited to the specific embodiment and that the above-described means may be replaced by magnetic, electric, mechanical or optical means if necessary.

For example, though the described embodiment shows the case where the raster information of a form is entered through a key-board, the invention is applicable to the case where the raster information is entered by the steps of reading a recorded form slide through light beams of laser or the like and converting analog signal to digital signal at every raster.

The method of the invention is not limited to use in COMs as described in the embodiment. It may of course be applied with equal utility to other systems which required compressing picture information having a lot of empty information as mainly composed of ruled lines.

As described above, according to the information compressing method of the invention, compressing can be made relatively easily, exactly and sufficiently compared with the prior art method, because all the form information is processed by repeated compressing process substantially comprising the steps of: dividing the raster information pattern of a certain raster into a plurality of units being each composed of a plurality of bits successively with respect to certain one of multiform information; comparing the unit information pattern of the units to thereby perform compressing in the unit ranking direction; and performing compressing in the raster ranking direction on the basis of the compressed information (that is, the contents of the unit memory and the contents of the real pattern memory) obtained by the compressing in the unit ranking direction.

Furthermore, the method of the invention can be designed to read form information, at the time of recording information, from memories temporarily storing compressed form information to be processed by a COM. Accordingly, the memories used do not required a high capacity. It is thereby possible to simplify the construction of the system and reduce manufacturing cost.

Furthermore, because the memories storing such compressed information are used herein, information expanding process at the time of writing the form information can be more simplified than the prior art. In addition, the time required for expanding information can be remarkably shortened compared with the prior art. For example, it is possible to write the information of one picture element in 30 nsec.

What is claimed is:

1. An information compressing method for storing a plurality of information forms in memories at every raster of each information form, comprising the steps of:

giving a raster address to each raster of each of a plurality of information forms in an order of raster scanning;

sectioning a raster information pattern of a raster corresponding to said raster address into a plurality of units respectively composed of a plurality of bits;

giving a unit address to each unit;

comparing a unit information pattern of one unit in said raster with another unit information pattern of a unit just prior to said one unit;

storing an agreement code in a unit memory when the two units agree with each other and storing a disagreement code in the unit memory when the two units disagree with each other;

storing the unit information pattern of said one unit as a real pattern in a real pattern memory when the two units disagree with each other;

comparing said raster with rasters ranking higher than said raster in order including rasters in one or more information forms not containing said raster;

changing the raster address of said raster to the raster address of a higher-ranking raster which agrees with said raster and storing said changed raster address in a raster address memory; and storing the raster address of said raster in a raster address memory when all compared rasters disagree with each other.

2. An information compressing method according to claim 1;

wherein said step of comparing said raster comprises:

comparing said raster with said rasters ranking higher than said raster in order with respect to agreement-/disagreement code pattern of said agreement and disagreement codes stored in said unit memory;

comparing said raster with said raster ranking higher than said raster in order with respect to the unit information pattern stored in said real pattern memory; and wherein said changing step changes the raster address when the two rasters agree with each other with respect to both said agreement/disagreement code pattern and said unit information pattern;

3. An information compressing method according to claim 2, in which said unit memory corresponding to the first unit in each of said rasters always stores a disagreement code, and in which said real pattern memory corresponding to said first unit always stores a unit pattern fixed for said first unit.

4. An information compressing method according to claim 3, wherein said unit information pattern storing step stores said real patterns in contiguous locations of said real pattern memory.

5. An information compressing method according to claim 1, further comprising expanding information and wherein said raster address memory, said unit memory and said real pattern memory constitute a group of memories used in said information expanding step.

6. An information compressing apparatus for storing a plurality of information forms in memories at every raster of each information form, comprising:
  means for giving a raster address to each raster of each of a plurality of information forms in an order of raster scanning;
  means for sectioning a raster information pattern of a raster corresponding to said raster address into a plurality of units respectively composed of a plurality of bits;
  means for giving a unit address to each unit;
  means for comparing a unit information pattern of one unit in said raster and another unit information pattern of a unit just prior to said one unit;
  a unit pattern memory;
  means for storing an agreement code in said unit memory when the two units agree with each other and storing a disagreement code in the unit memory when the two units disagree with each other;
  a real pattern memory;
  means for storing the unit information pattern of said one unit as a real pattern in said real pattern memory when the two units disagree with each other;
  means for comparing said raster with rasters ranking higher than said raster in order including rasters in one or more information forms not containing said raster;
  a raster address memory;
  means for changing the raster address of said raster to the raster address of a higher-ranking raster which agrees with said raster and storing said changed raster address in said raster address memory; and
  means for storing the raster address of said raster in said raster address memory when all compared rasters disagree with each other.

7. An information compressing apparatus according to claim 6;
  wherein said raster comparing means comprises:
  means for comparing said raster with said rasters ranking higher than said raster in order with respect to a agreement/disagreement code pattern of said agreement and disagreement codes stored in said unit memory;
  means for comparing said raster with said raster ranking higher than said raster in order with respect to the unit information pattern stored in said real pattern memory; and
  wherein said changing means changes the raster address when the two rasters agree with each other with respect to both said agreement/disagreement code pattern and said unit information pattern;

8. An information compressing apparatus according to claim 7, in which said unit memory corresponding to the first unit in each of said rasters always stores a disagreement code, and in which said real pattern memory corresponding to said first unit always stores a unit pattern fixed for said first unit.

9. An information compressing apparatus according to claim 8, wherein said unit information pattern storing means stores said real patterns in contiguous locations of said real pattern memory.

10. An information compressing apparatus according to claim 6, further comprising means for expanding information and wherein said raster address memory, said unit memory and said real pattern memory constitute a group of memories used in said information expanding means.

* * * * *